United States Patent Office 2,697,905
Patented Dec. 28, 1954

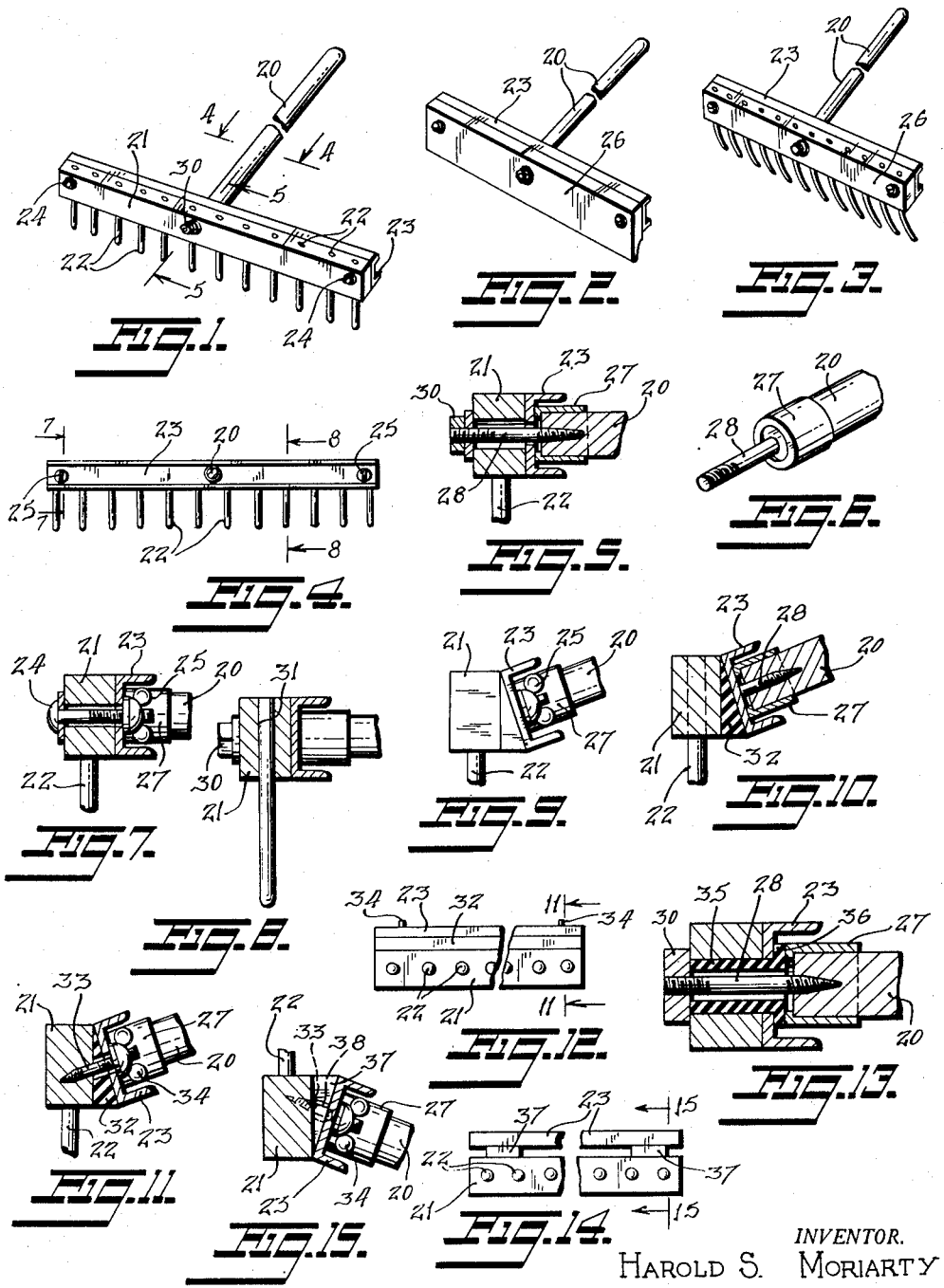

2,697,905

INTERCHANGEABLE HAND IMPLEMENT

Harold S. Moriarty, Brooklyn, N. Y.

Application October 26, 1949, Serial No. 123,692

9 Claims. (Cl. 56—400.01)

This invention relates to garden tools such as rakes, hoes, weeders, scrapers or the like, and has for its principal object the provision of improved, interchangeable garden tool handle and head piece means.

Another object of the invention resides in the provision of means for minimizing the transmission of impact shocks received by the head piece, from the latter to the handle and thereby to eliminate a major source of handle and/or head piece breakage.

A further object of the invention is the provision of handle and head piece interconnecting means whereby the working portion of said head piece is positioned ideally when the handle is inclined upwardly therefrom to the user's hands.

Still another object of the invention resides in the provision of novel rake means whereby the rake head piece may be replaced in its entirety in event of severe damage.

Still another object of the invention resides in the provision of novel rake head piece means having individually replaceable rake tines.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a rake constructed in accordance with the invention.

Fig. 2 is a perspective view of a scraper constructed in accordance with the invention.

Fig. 3 is a perspective view of a weeder constructed in accordance with the invention.

Fig. 4 is a rear view of the rake taken on line 4—4 of Fig. 1.

Fig. 5 is a fragmentary enlarged sectional view on line 5—5 of Fig. 1, and illustrates the means for connecting the rake head piece and the handle.

Fig. 6 is a fragmentary, enlarged perspective view of the head piece end of the handle.

Fig. 7 is an enlarged sectional view on line 7—7 of Fig. 4.

Fig. 8 is an enlarged sectional view on line 8—8 of Fig. 4.

Fig. 9 is an enlarged edge view of a modified rake head portion.

Fig. 10 is an enlarged sectional view through the modified head piece with the section taken on a line through the center of the handle.

Fig. 11 is an enlarged sectional view on line 11—11 of Fig. 12, but turned 180°.

Fig. 12 is a bottom view of the modified rake head portion with the center thereof broken away and the ends moved together.

Fig. 13 is an enlarged view similar to Fig. 5 but showing a modified form of the device shown therein.

Fig. 14 is a view similar to Fig. 12 but illustrates a modified form of the device shown in Fig. 12.

Fig. 15 is a sectional view similar to Fig. 11 but illustrating a modified form of the device shown in Fig. 11.

The garden tool according to the embodiment of the invention illustrated in Fig. 1 is in the form of a rake having a hardwood handle 20 secured to a transverse hardwood head piece 21 from which projects a series of rake tines or teeth in the form of hardwood pegs 22.

The head piece 21 is reenforced by a channel bar 23 (see also Figs. 4 and 7) of steel, iron, brass or other suitable material secured thereto by screws 24 passing through the head piece 21 and drawn up in wing nuts 25 positioned in the channel. The purpose of the wing nuts 25 is to permit the channel bar 23 to be quickly and easily separated from the rake head piece 21 and secured to the head piece 26 of a weeder as shown in Fig. 3 or a scraper as shown in Fig. 2, or a hoe head piece or a head piece adapted for use as any other type of garden tool. Thus, one angle bar 23 suffices for a number of garden tool head pieces.

The handle 20 has its head piece end protected by a metallic band 27 which overlaps said end and abuts the channel bar at an angle of 90° and has projecting therefrom a threaded stud 28 which passes through aligned holes in the channel bar 23 and head piece 21 (Fig. 5) and is drawn up in a nut 30 to secure the handle and head piece together. As shown in Fig. 5 the portion of stud 28 imbedded in handle 20 has the form of a wood screw whose threads are pitched in the opposite direction to those engaged in the nut 30, so that the handle 20 can be twisted to withdraw stud 28 from nut 30 without affecting the engagement of the stud with the handle 20. Thus the handle also can be separated quickly and easily from the head piece 21 for use with another head piece, for example, one of those shown in Figs. 2 and 3.

As stated above the tines of the rake head piece 21 are in the form of wooden pegs 22. Referring to Fig. 8 it will be seen that each of said pegs is mounted in an individual hole 31 in the head piece 21 and is secured in said hole by means of a force fit, that is to say, the peg and the hole have substantially the same diameter and the peg has to be hammered or otherwise forced into the hole. This construction provides for replacing broken pegs 22 individually, it not being necessary to purchase a complete head piece when one or more pegs become damaged, worn out or broken.

It is believed evident from the foregoing that the invention provides an economical and highly versatile arrangement whereby one handle and one channel bar suffice for a plurality of garden tool head pieces.

In some instances it is desired that the handle 20 project from the head piece 21 not at an angle of 90° but at an upward inclination therefrom so that, for example, when the handle is held in the user's hands, the tines 22 of the rake head piece are positioned at an angle of 90° to the surface being worked thereby.

To this end the construction described hereinbefore is modified as shown in Figs. 9—12. In this form of the invention the rake, or other, head piece 21 is constructed substantially the same as before as, also, are the channel bar 23 and handle 20. There is however an angle bar 32 inserted between the head piece and the channel bar (Figs. 9 and 12) so that the channel bar and the handle, which as presently to be described, is secured to the channel bar, are positioned at an upward inclination to the head piece. The stud 28 (Fig. 10) which projects from the handle 20 is foreshortened in this construction and is threaded into the channel bar 23, not entering the head piece 21 as in the construction described hereinbefore.

The channel bar 23 is secured to the head piece 21 (Fig. 11) by means of studs 33 having at one end wood screw threads screwed into the head piece 21 at an angle, and at the other end oppositely pitched machine threads drawn up in wing nuts 34 positioned in the channel of bar 23.

It will be seen therefore that the inventive principle has been carried on in this modified construction, the handle 20 and the channel bar being removable simply and quickly from one head piece for use with another. It is to be noted that in this construction it is not necessary to remove the handle 20 from channel bar 23 when shifting head pieces, but can be left in the separately removable channel bar. The handle is made removable from the channel bar however to simplify storing and packing the same and also to simplify replacement thereof in the event that it should break.

In another embodiment of the invention, means are provided to minimize the transmission of impact shocks from the head piece 21 or 26 to the handle 20 and thus to eliminate a major source of handle breakage.

This means is illustrated as applied to the first form of the invention in Fig. 13 which is an enlarged copy of Fig. 5 with the shock absorbent means added. It will be remembered that in that form of the invention the capped end of handle 20 abutted the channel bar 23. According to the present modification a bushing 35, of rubber, neoprene or the like resilient material, having a bearing collar 36 is inserted through the aligned holes in the channel bar 23 and head piece 21 utilized by the handle stud 28, said collar being positioned between the capped end of handle 20 and the channel bar 23.

The construction is such that impact shocks received by head piece 21 are absorbed by bushing 35, 36 and either are not transmitted to the handle 20 or are so lessened in transmission that handle 20 is not adversely affected thereby.

In Figs. 14 and 15 there is illustrated the means whereby the handle 20, in the form of the invention wherein said handle is secured to the head piece at an upward inclination, is protected against impact shocks received by said head piece.

In this form of the invention the only connection of the handle 20 with the head piece 21 is through the angle bar 23 which is positioned at an angle to said head piece by the angle bar 32 (Fig. 11). This angle bar therefore is replaced by a pair of angular blocks 37 of rubber neoprene or the like each having a hole 38 to receive the stud 33.

The construction is such that impact shocks received by head piece 21 cause said head piece to rock about the handle 20 as a pivotal center, one of the rubber blocks 37 being compressed and the associated wing nut 34 moving away from the channel bar 23. Thus, destructive force of such impact shocks is dissipated before reaching the handle 20.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A garden tool comprising a working head piece a plurality of equispaced tines supported by said piece, said tines lying in a plane parallel to the longitudinal axis of said piece, a strengthening channel bar detachably secured to said head piece, a cylindrical handle having its end terminating in the channel of said channel bar the axis of said handle being normal to said tine positioning plane, a band secured on said handle and overlapping said end thereof and abutting said channel bar, said head piece and bar having aligned holes in the center, a threaded stud projecting from the end of said handle through said holes and a nut for said threaded stud to secure the handle and the head piece together, a portion of said stud being threadably embedded in said handle and being threaded in a direction opposed to the thread on the projecting portion of the stud.

2. A garden tool comprising a working head piece a plurality of equispaced tines supported by said piece, said tines lying in a cylindrical surface having its generatrix parallel to the longitudinal axis of said piece, a strengthening channel bar detachably secured to said head piece, a cylindrical handle having its end terminating in the channel of said channel bar the axis of said handle being normal to said generatrix, said head piece and bar having aligned holes in the center, a threaded stud projecting from the end of said handle through said holes and a nut for said threaded stud to secure the handle and the head piece together, said head piece and bar having aligned holes near either end thereof, a screw extending through each pair of the latter said aligned holes, and a wing nut drawn up on each screw against said channel bar a portion of said stud being threadably embedded in said handle and being threaded in a direction opposed to the thread on the projecting portion of the stud.

3. A garden tool comprising a working head piece, a strengthening channel bar detachably secured to said head piece, an angle bar detachably secured between said head piece and said channel bar and adapted to position said angle bar at an angle relative to said head piece, a detachable handle having its end terminating in the channel of said channel bar, said channel bar having a threaded hole in the center thereof, and a threaded stud projecting from the end of said handle and drawn up in said hole, said handle being positioned thereby at an upward inclination to said head piece.

4. A garden tool comprising a working head piece, said head piece having a plurality of equispaced holes therein, a rake tine for each hole each comprising a peg of substantially the same diameter as a hole force fitted into said hole, a strengthening channel bar detachably secured to said head piece, an angle bar detachably secured between said head piece and said channel bar and adapted to position said angle bar at an angle relative to said head piece, a detachable handle having its end terminating in the channel of said channel bar, said channel bar having a threaded hole in the center thereof, and a threaded stud projecting from the end of said handle and drawn up in said hole, said handle being positioned thereby at an upward inclination to said head piece.

5. A garden tool comprising a working head piece, a strengthening channel bar detachably secured to said head piece, an angle bar detachably secured between said head piece and said channel bar and adapted to position said angle bar at an angle relative to said head piece, a detachable handle having its end terminating in the channel of said channel bar, said channel bar having a threaded hole in the center thereof, and a threaded stud projecting from the end of said handle and drawn up in said hole, said handle being positioned thereby at an upward inclination to said head piece, said head piece and bar having aligned holes near either end thereof, a pair of threaded studs each projecting from said head piece at right angles to said channel bar and extending through said aligned holes, and a wing nut drawn up on each of the latter said studs against the channel bar.

6. A garden tool comprising a working head piece, a strengthening channel bar detachably secured to said head piece, a detachable handle having its end terminating in the channel of said channel bar, said head piece and bar having aligned holes in the center, a rubber bushing inserted in said aligned holes and having a bearing collar surrounding the edge of the hole in the channel bar, a threaded stud projecting from the end of said handle through said bushing and a nut for said threaded stud to secure the handle and the head piece together, the end of said handle being pressed against said collar.

7. A garden tool comprising a working head piece, a strengthening channel bar detachably secured to said head piece, a pair of rubber angle blocks detachably secured between said head piece and said channel bar and adapted to position said angle bar at an angle relative to said head piece, a detachable handle having its end terminating in the channel of said channel bar, said channel bar having a threaded hole in the center thereof, and a threaded stud projecting from the end of said handle and drawn up in said hole, said handle being positioned thereby at an upward inclination to said head piece.

8. A garden tool comprising a working head piece, a strengthening channel bar detachably secured to said head piece, a pair of rubber angle blocks detachably secured between said head piece and said channel bar and adapted to position said angle bar at an angle relative to said head piece, a detachable handle having its end terminating in the channel of said channel bar, said channel bar having a threaded hole in the center thereof, and a threaded stud projecting from the end of said handle and drawn up in said hole, said handle being positioned thereby at an upward inclination to said head piece, said channel bar having holes near either end thereof, each of said blocks having a hole therein which is aligned with one of the holes in said bar, a pair of threaded studs each projecting from said head piece at right angles to said channel bar and extending through said aligned holes, and a wing nut drawn up on each of the latter said studs against the channel bar.

9. A garden tool comprising an elongated head piece having a plurality of spaced openings therein and including a working member, said working member lying in a plane parallel to the longitudinal axis of said head piece, an elongated channel bar positioned adjacent said head piece, said bar having a plurality of openings in its face in registration with the openings in said head piece, a cylindrical handle member havng its axis normal to the longitudinal axis of said channel member, a threaded stud positioned coaxial with said cylindrical handle member and adapted to pass through one of said registered openings in said channel bar and said head piece, and a plurality of threaded means each adapted to pass through the remaining registered openings in said channel bar and head piece, a portion of said stud being threadably embedded in said handle and being threaded in a direction opposed to the thread on the projecting portion of the stud.

References Cited in the file of this patent

UNITED STATES PATENTS

| Number | Name | Date |
|---|---|---|
| 213,671 | Lucas | Mar. 25, 1879 |
| 465,919 | Browne | Dec. 29, 1891 |
| 533,131 | Knight | Jan. 29, 1895 |
| 563,281 | Kuehl | July 7, 1896 |
| 614,356 | Watson | Nov. 15, 1898 |
| 837,140 | Smyth | Nov. 27, 1906 |
| 852,245 | Stewart | Apr. 30, 1907 |
| 1,089,298 | Ward | Mar. 3, 1914 |
| 1,305,711 | Gilchrist | June 3, 1919 |
| 1,485,257 | Dye | Feb. 26, 1924 |
| 1,563,745 | Hillyard | Dec. 1, 1925 |
| 1,585,570 | Swanson | May 18, 1926 |
| 1,705,441 | Cramer | Mar. 12, 1929 |
| 1,798,419 | Hertzberg | Mar. 31, 1931 |
| 2,098,572 | Depue | Nov. 9, 1937 |
| 2,217,369 | Jacobsen | Oct. 8, 1940 |

FOREIGN PATENTS

| Number | Country | Date |
|---|---|---|
| 29,210 | Great Britain | Dec. 19, 1912 |
| 747,264 | France | Mar. 28, 1933 |